(12) United States Patent
Demmitt

(10) Patent No.: US 11,473,699 B2
(45) Date of Patent: Oct. 18, 2022

(54) TUBING SUPPORT SYSTEM

(71) Applicant: Biolytic Lab Performance, Inc., Fremont, CA (US)

(72) Inventor: Thomas J. Demmitt, Fremont, CA (US)

(73) Assignee: Biolytic Lab Performance, Inc, Fremont, CA (US)

( * ) Notice: Subject to any disclaimer, the term of this patent is extended or adjusted under 35 U.S.C. 154(b) by 9 days.

(21) Appl. No.: 17/360,022

(22) Filed: Jun. 28, 2021

(65) Prior Publication Data

US 2021/0404578 A1 Dec. 30, 2021

Related U.S. Application Data

(60) Provisional application No. 63/102,681, filed on Jun. 26, 2020.

(51) Int. Cl.
*F16L 3/223* (2006.01)
*F16B 7/18* (2006.01)
*B01J 19/24* (2006.01)

(52) U.S. Cl.
CPC ............. *F16L 3/223* (2013.01); *F16B 7/18* (2013.01); *B01J 19/2425* (2013.01); *B01J 2219/32279* (2013.01)

(58) Field of Classification Search
CPC ... F16L 3/223; F16L 3/04; F16L 37/05; F16B 7/18; F16B 2/005; F16B 2/14; F16B 7/02; B01J 19/2425; B01J 2219/32279
See application file for complete search history.

(56) References Cited

U.S. PATENT DOCUMENTS

| 5,262,530 A | 11/1993 | Andrus et al. |
| 5,368,823 A | 11/1994 | McGraw et al. |

(Continued)

OTHER PUBLICATIONS

S.Rayner et al., "MerMade: An oligodeoxyribonucleotide synthesizer for high throughput oligonucleotide production in dual 96-well plates", Genome Research, Cold Spring Harbor Laboratory Press ISSN 1054-9803/98, Jul. 1998, 8:741-747.

(Continued)

*Primary Examiner* — Terrell L McKinnon
*Assistant Examiner* — Ding Y Tan
(74) *Attorney, Agent, or Firm* — Mark Protsik; Thomas Schneck

(57) ABSTRACT

A mechanism for securing tubes in a fixed position is described wherein a body to which a tube is to be fixed has at least one smooth bore hole extending therethrough. A tube has an inner diameter accommodating fluid flow and an outer diameter passing through the smooth bore hole in slip fit relation with the smooth bore of the hole. A threaded hole with helical grooves is parallel to the smooth bore hole and located such that its grooves intersect the diameter of the smooth bore hole. A set screw made of a tougher material than the tube has threads that will seat in the threaded hole in a manner such that advancing the set screw scratches the outer diameter of the tube to a depth wherein the set screw retains the tube in place without deformation of the inner diameter of the tube whereby fluid flow in the tube is not affected by advancement of the set screw while the tube is retained in place by the set screw. The invention can connect tubes in all sorts of patterns with many center-to-center tube distances.

20 Claims, 14 Drawing Sheets

(56) References Cited

U.S. PATENT DOCUMENTS

| | | | |
|---|---|---|---|
| 5,550,059 | A | 8/1996 | Boger et al. |
| 5,641,459 | A | 6/1997 | Holmberg |
| 5,961,925 | A | 10/1999 | Ruediger et al. |
| 6,054,100 | A | 4/2000 | Stanchfield et al. |
| 6,083,682 | A | 7/2000 | Campbell et al. |
| 6,270,730 | B1 | 8/2001 | McLuen et al. |
| 6,464,852 | B1 | 10/2002 | Gorfinkel et al. |
| 6,673,318 | B1 | 1/2004 | Nishimura |
| 6,800,250 | B1 | 10/2004 | Hunicke-Smith et al. |
| 6,818,060 | B2 | 11/2004 | Stewart et al. |
| 6,893,877 | B2 | 5/2005 | Hunter et al. |
| 7,311,882 | B1 * | 12/2007 | Renzi .................... B01L 3/565 422/546 |
| 7,691,316 | B2 | 4/2010 | Ngo et al. |
| 7,988,934 | B2 | 8/2011 | Balmer |
| 8,084,245 | B2 | 12/2011 | Brennan |
| 8,465,694 | B2 | 6/2013 | Lebl et al. |
| 9,095,833 | B2 | 8/2015 | Demmitt |
| 10,167,887 | B1 * | 1/2019 | Phillips .................... B60D 1/02 |
| 10,233,644 | B2 * | 3/2019 | Ganis .................... F16L 41/086 |
| 2008/0269076 | A1 | 10/2008 | Ermakov |
| 2013/0323138 | A1 | 12/2013 | Demmitt |
| 2017/0203322 | A1 | 7/2017 | Irvi et al. |
| 2020/0087919 | A1 * | 3/2020 | Ravan ................. E04F 11/1812 |

OTHER PUBLICATIONS

D.A. Lashkari et al., "An automated multiplex oligonucleotide synthesizer: Development of high-throughput, low-cost DNA synthesis", Proc. National Academy Science USA, vol. 92, pp. 7912-7915, Aug. 1995.

Printout: "DNA/RNA Synthesizers Models 392 and 394" Users Manual, Applied Biosystems, May 1991, 3 sections: Section 5—System Description-Hardware, Section 6—Chemistry for Automated DNA/RNA Synthesis, Appendix II—392 and 394 Synthesizer Schematics.

\* cited by examiner

TUBING SUPPORT SYSTEM

CROSS-REFERENCE TO RELATED APPLICATION

This application claims priority from provisional application No. 63/102,681, filed Jun. 26, 2020, titled "Simple Connection System for Tubing".

TECHNICAL FIELD

The invention relates to tube supports and, more particularly, to an apparatus and method for supporting tubes in a plate or bracket.

BACKGROUND ART

Traditional methods for supporting tubes in systems with fluidic components has been to use threaded fittings that involve a threaded tube nut and ferrule or a threaded tub nut and a flair on the end of the tube. Threaded tube nuts are expensive and bulky limiting the minimum center to center distance tubes can be mounted when mounting to distribution and dispensing manifolds. Each tube connection also needs either a ferrule or a flair. Flairs need special tools to create and can be difficult to construct. Ferrules can squeeze a tube and deform the inside diameter of the tube resulting in reduction of flow rates and/or trapping debris and clogging the tube. A solution has been to add an insert to keep the tube from collapsing. However, this adds more expense and more time to assemble. It also creates a narrower opening that tends to catch small particles and clog more easily.

A need to develop such an improved tube support system was apparent in developing a new high throughput automated solid phase synthesizer capable of synthesis on 384 and 1536 well plates, hereafter known as synthesis reaction plates. Optimizing design of said automated high throughput solid phase synthesizers require mounting large numbers of tubes close together so that one tube can dispense into one well of synthesis reaction plates such as 384 or higher density said synthesis reaction plates while minimizing time needed to dispense synthesis reagents into individual wells in said synthesis reaction plates.

An object of the present invention is to provide a tube support system that is easier to manufacture, easier to maintain, has lower initial parts cost, lower maintenance cost, allows higher density of tubes and better performance than traditional tube support systems.

SUMMARY DISCLOSURE

The above object has been met by a mechanism to secure a tube to a desired fixed location using a slip-fit tube hole, an intersecting threaded hole with a set screw. One or more tubes can, for example, be affixed to a manifold allowing a tube end to have its orifice joined with an unobstructed path to a valve port, replacing the prior need for tube nuts and ferrules. Likewise, an outlet end of one or more tubes can be fixed to a bracket on an instrument frame to allow fluid from the tube to land in one or more associated reaction vessels of the instrument. Still further, tubes can be fixed directly to valve ports using the threaded hole and set screw mechanism formed on the valve itself. Groups of tubes (such as a linear group, matrix, or bundle) can be precisely positioned in relation to valve ports or instrument brackets with separations far closer than tube nuts would allow. Each threaded hole and set screw can secure either a single tube or multiple tubes, depending on the relation of tube through-hole or holes to the intersecting threaded hole with set screw.

In one embodiment, a new tube support system for a plate or planar bracket has at least one smooth bore hole through the plate or planar bracket with an axis generally perpendicular but not necessarily perpendicular to the plate. The hole has a diameter that allows a slip fit for a tube to be used for fluid flow that is mounted extending through the hole. The tube diameter allows one to insert the desired tube into and through the smooth bore hole as deep as needed in a slip fit relationship. A blind threaded hole is created adjacent to the tube smooth bore hole in a relationship such that the blind threaded hole threads intersect or overlap the diameter of the smooth bore hole with an intersection of between 0.005 inch and 0.025 inch (about 125 µm to 635 µm). A set screw mounted in the threaded hole has threads that are used for scratching the tube outer diameter surface at the peripheral intersection with the tube. The set screw is preferably inserted into the blind threaded hole until the screw hits the bottom of the blind threaded hole. Enough set screw threads scratch or intersect the adjacent outer diameter wall of the tube to firmly grip the tube in a fixed relation to its support plate or bracket. The set screw is made of a second material that is selected to be tougher than the first material to promote scratching the surface of the tube. The screw threads are not so deep in the tube material as to distort the inside diameter of the tube. Fluid flow in the tube is not affected by advancement of the set screw in the threaded hole. The invention provides a tube support system that overcomes the negative aspects of current tube support and connection systems.

BRIEF DESCRIPTION OF THE DRAWINGS

FIG. 1-B is a cutaway view of FIG. 1-A.

FIG. 2 shows the strip with 16—each tubes per strip with tubes mounted with their centers 4.5 millimeters apart.

FIG. 3-B is a cutaway to show the internal construction. FIG. 3-C shows a top view of the intact assembly.

FIG. 4-A is an isometric view, while FIG. 4-B is a cutaway view showing the construction of the manifold common port where fluid is received into the manifold and sent to each of the 8 valves. FIG. 4-C is a cutaway of the same valve manifold however it is showing the controlled exit ports each with a tube coupled to it in accordance with the invention.

FIG. 5-A is an isometric view and FIG. 5-B is the same isometric view with a cutaway to reveal the construction of mounting tubes which is in accordance with the invention.

FIG. 6-A is an isometric view with internal features shown in dashed lines while FIG. 6-B is a cutaway view of the single valve.

DETAILED DESCRIPTION

Figure 1A:
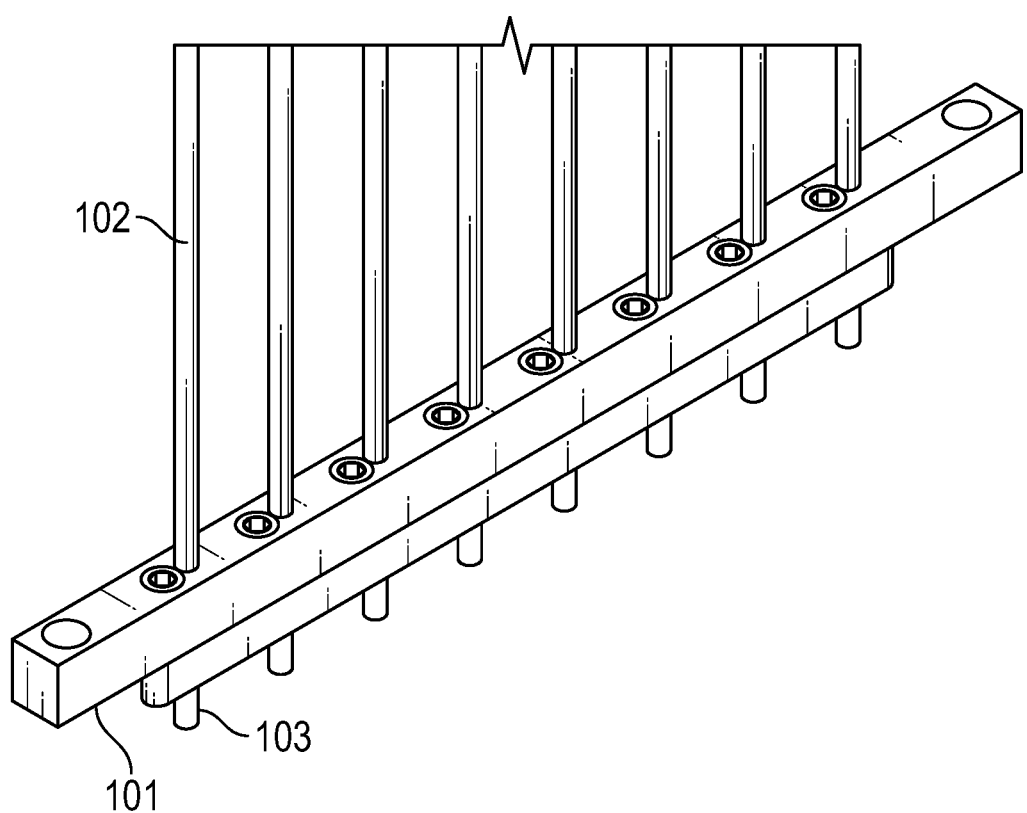
FIG. 1-A is an isometric view of a strip with 8—each tubes fixed to it in accordance with the invention.

The invention teaches a tubing connection system for securing tubes in a fixed position. A tube, by definition, has a flow path through the tube and an orifice at each end. The flow path is usually, although not always, through the center of the tube, and likewise the orifices are usually centered at each tube end. The invention can be used to fix a tube to anything that needs to have a tube fixed to it, whether an instrument bracket, a manifold, a valve, tube adapter etc. The invention secures the tube end to a desired fixed location using a tube slip-fit hole and an intersecting threaded hole with set screw in the device to which the tube is securely fixed. The set screw hole is preferably, but not necessarily, a blind hole. The tube slip-fit hole has an ID that is a slip-fit for the OD of the tube end that is being fixed in place.

In one scenario where the invention may be useful, one might have a 2-way solenoid valve with a first port and a second port where it is necessary to fix one end of a tube to the first port of the valve so that there is an unobstructed, fluid tight, flow path between valve first port and the orifice at the end of the tube so that the orifice in the tube is concentric to the first port of the valve. Traditionally, valves are designed to have either a provision to use a tube nut and ferrule, usually ¼-28 size, however there are also other sizes, to fix the end of a tube to the valve ports directly or, alternatively, valves themselves have no means to fix a tube end to their ports directly, thus requiring a manifold or tube adapter. In the latter case, the manifold or adapter is designed to have a through hole or flow path with a first end and a second end where the first end of the manifold or adapter flow path can be mated to the valve first port creating a fluid tight flow path from the valve first port to the manifold or adapter fluid flow path first end and the second end of the manifold or adapter flow path is designed to fix the end of a tube so that a fluid tight flow path is created between the manifold or adapter flow path second end and the tube end. However, tube nut and ferrule arrangements result in an unwanted narrowing of the tube inner diameter over time due to the ferrule squeezing the tube, causing a reduction in the fluid rate over time. In addition, tube nuts and ferrules are relatively expensive.

The present invention provides a way to join the orifice of one end of a tube to a valve port, either directly to the valve or through a manifold or an adapter. In the latter case, the manifold or adapter has a hole that is a slip-fit for the outer diameter of the tube located on the manifold or adapter where the tube needs to be fixed. There is a threaded hole next to the slip-fit tube hole such that threads of the threaded hole intersect the diameter of the tube hole. Screwing a set screw into the threaded hole after inserting the end of a tube into the tube slip-fit hole fixes the end of the tube to the manifold or adapter. Likewise, the valve itself can be made with a provision for fixing tubes to its ports directly using a threaded hole and set screw arrangement of the invention. In either case, the mechanism for fixing the tube end directly to the valve port is essentially the same as fixing a tube end to a manifold or adapter port and avoids the need for a tube nut and ferrule.

In another scenario, a design may have a bracket fixed in place on an instrument frame. The design needs a tube to carry fluid to a point in the instrument defined by the bracket so that fluid exiting an orifice of the tube will flow through space and in a decided location which is referred to as a reaction vessel for purposes of this description. Therefore, the tube must be fixed to the bracket such that the tube end cannot move out of position and the orifice is directly above the open top of the reaction vessel. Again, while one could have a bracket that allows for using a ¼-28 or other size tube nut and ferrule to fix the tube to the bracket, the same drawback of squeezed tube narrowing over time would occur.

The present invention provides the bracket with a slip-fit hole and intersecting threaded hole to secure the tube to a fixed position, in essentially the same manner as with the manifold.

In yet another scenario, one may wish to duplicate the previous setup with multiple tubes, such as with a linear group of 16 tubes with a 4.5 mm center-to-center separation between adjacent tubes. In that case, one could not use ¼-28 tube nuts and ferrules at all, because the tube nuts are too large (about 6.5 mm outer diameter). Although there exist smaller 10-32 and 6-32 tube nuts, they typically cost five to ten times as much as the ¼-28 size and still have the disadvantages of tube nut and ferrule connections.

The present invention provides for the ability to provide close tube spacings. Manifolds and brackets can be supplied with multiple tube holes with threaded holes intersecting the tube holes. Indeed, the same threaded hole can intersect more than one tube hole and thereby secure multiple tubes with a common set screw. Linear arrays of tubes, two-dimensional arrays of tubes, and tube bundles, can all be secured in fixed precise positions relative to corresponding valve ports or reaction vessel openings. Tubes can be made of any material suitable to the fluid system, such as polyethylene (PE), polypropylene (PP), polyether ether ketone (PEEK), polytetrafluoroethylene (PTFE) (also known as Teflon™), polyphenylene sulfide (PPS) (also known as Ryton®), stainless steel, etc. The tubes may be flexible or rigid.

Figure 1B:
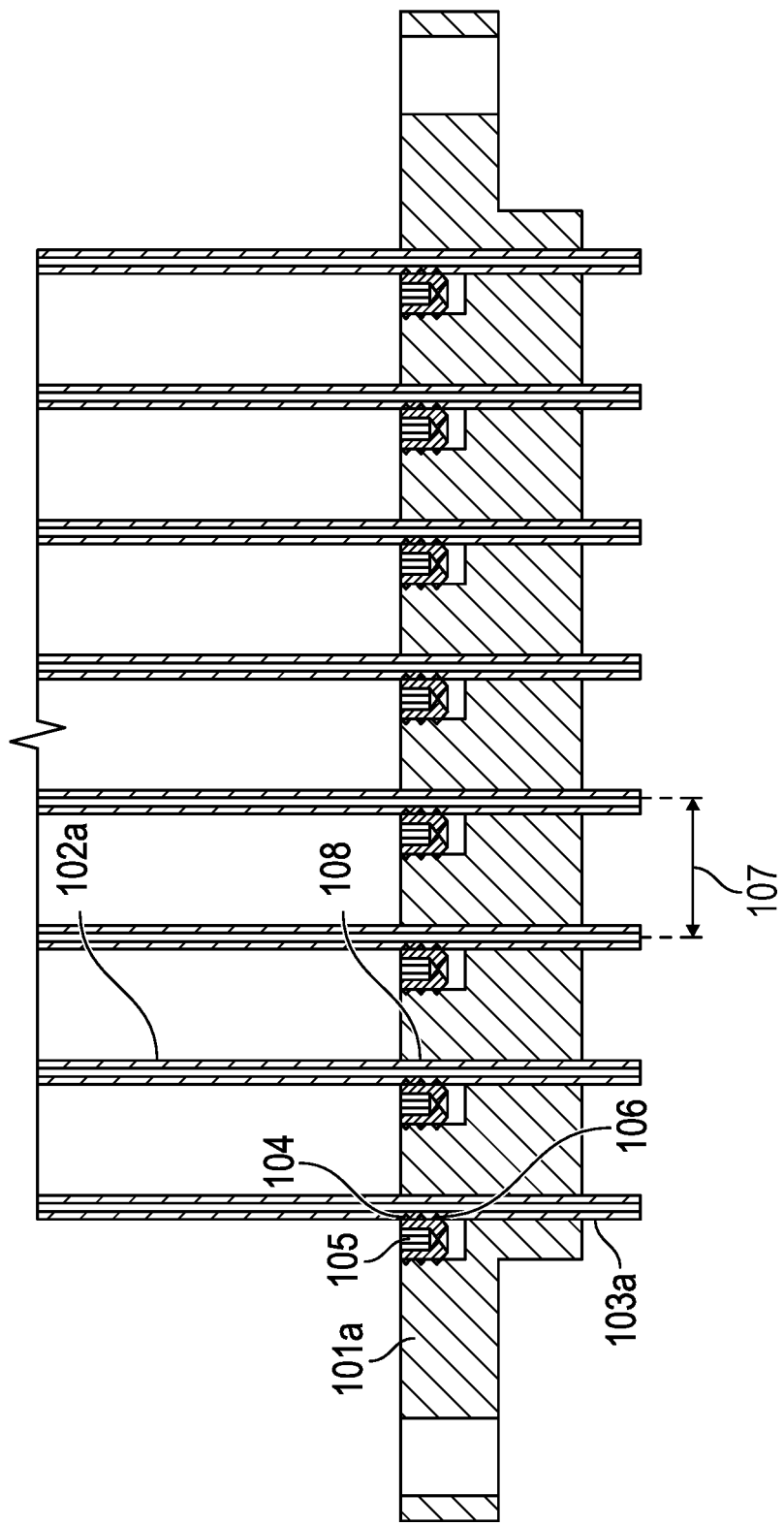

FIG. 1 shows two views of an eight-tube dispensing manifold 101, FIG. 1-A which is an isometric view shows the assembly intact. FIG. 1-B which is a cutaway of the assembly 101a, shows the internal construction. FIG. 1 views show all eight tubes and eight set screws for clarity. Also, for clarity the labeling of parts and description thereof points to one item where multiples of the same item are present in the figure. FIG. 1 illustrates one embodiment of the invention mounting eight each dispense tubes 102(a), in a linear pattern with 9 millimeters between the centers 107, of each adjacent tube 102(a), forming an 8-tube dispense manifold assembly. FIG. 1-B shows the individual construction parts of the assembly such that tube 102(a), passes through slip fit hole 108, which is drilled through manifold 101(a), such that tube 102(a), end 103(a), protrudes past the dispense manifold 101(a). Set screw 105, is screwed into manifold 101(a), such that the threads 104, of the set screw 105, intersect 106, with the outer wall 108, of the tubes 102(a). In this embodiment, each set screw 105, can secure one tube 102(a).

Figure 2A:
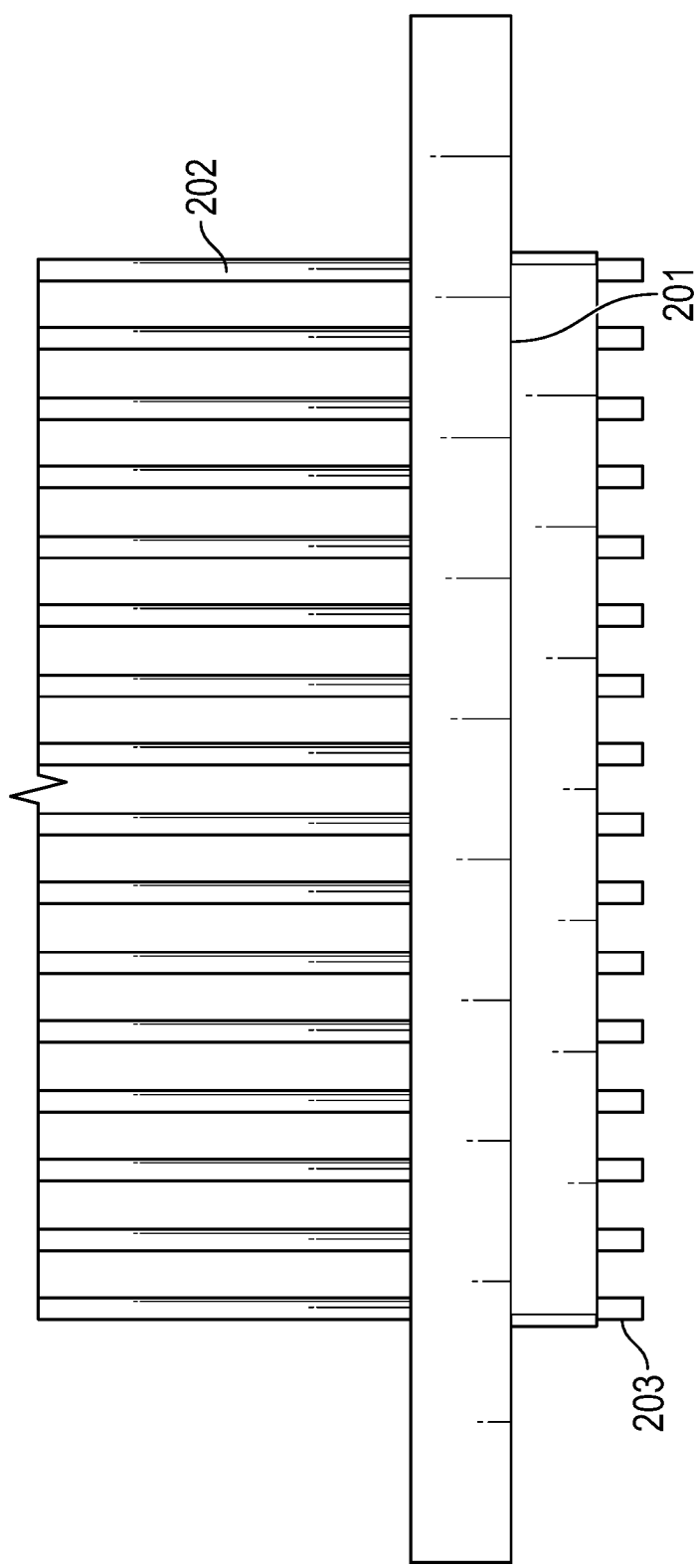
FIGS. 2-A and 2-B show a strip containing tubes mounted as in FIGS. 1-A and 1-B. However.
Figure 2B:
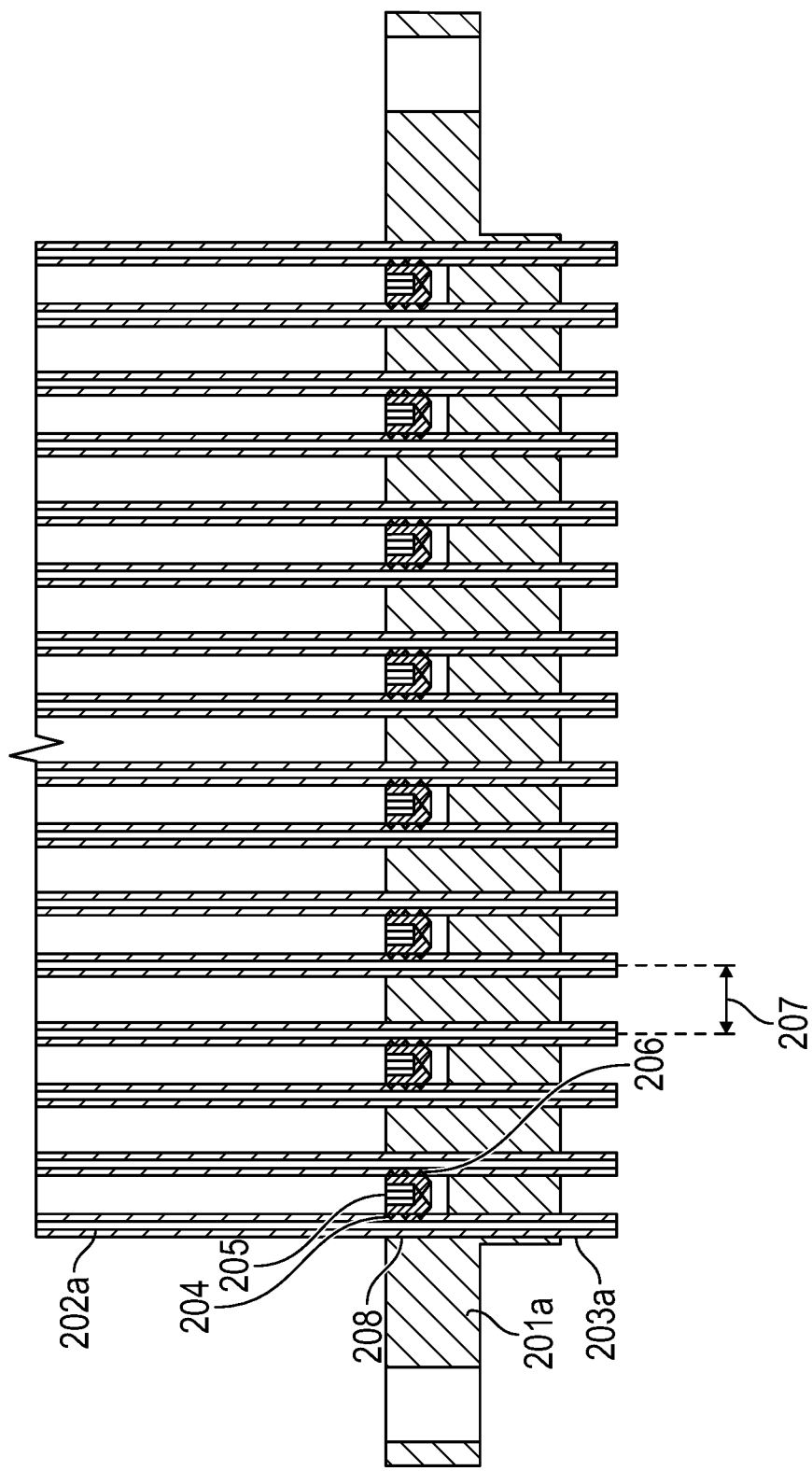

FIG. 2 shows two views of a sixteen-tube dispensing manifold 201(a), FIG. 2-A which is a front view shows the assembly intact. FIG. 2-B which is a cutaway of the assembly shows the internal construction. FIG. 2 views show all sixteen tubes and eight set screws for clarity. Also, for clarity the labeling of parts and description thereof points to one item. FIG. 2 illustrates one embodiment of the invention mounting sixteen each dispense tubes 202(a), in a linear pattern with 4.5 millimeters between the centers 207, of each adjacent tube 202(a), forming a 16 tube dispense manifold assembly. FIG. 2-B shows the individual construction parts of the assembly such that tube 202(a), passes through slip fit hole 208, which is drilled through manifold 201(a), such that tube 202(a), end 203(a), protrudes past the dispense manifold 201(*a*). Set screw 205, is screwed into manifold 201(*a*), such that the threads 204, of the set screw 205, intersect 206, with the outer wall 208, of the tubes 202(*a*). In this embodiment, each set screw 205, secure 2 tubes 202(*a*).

Figure 3A:
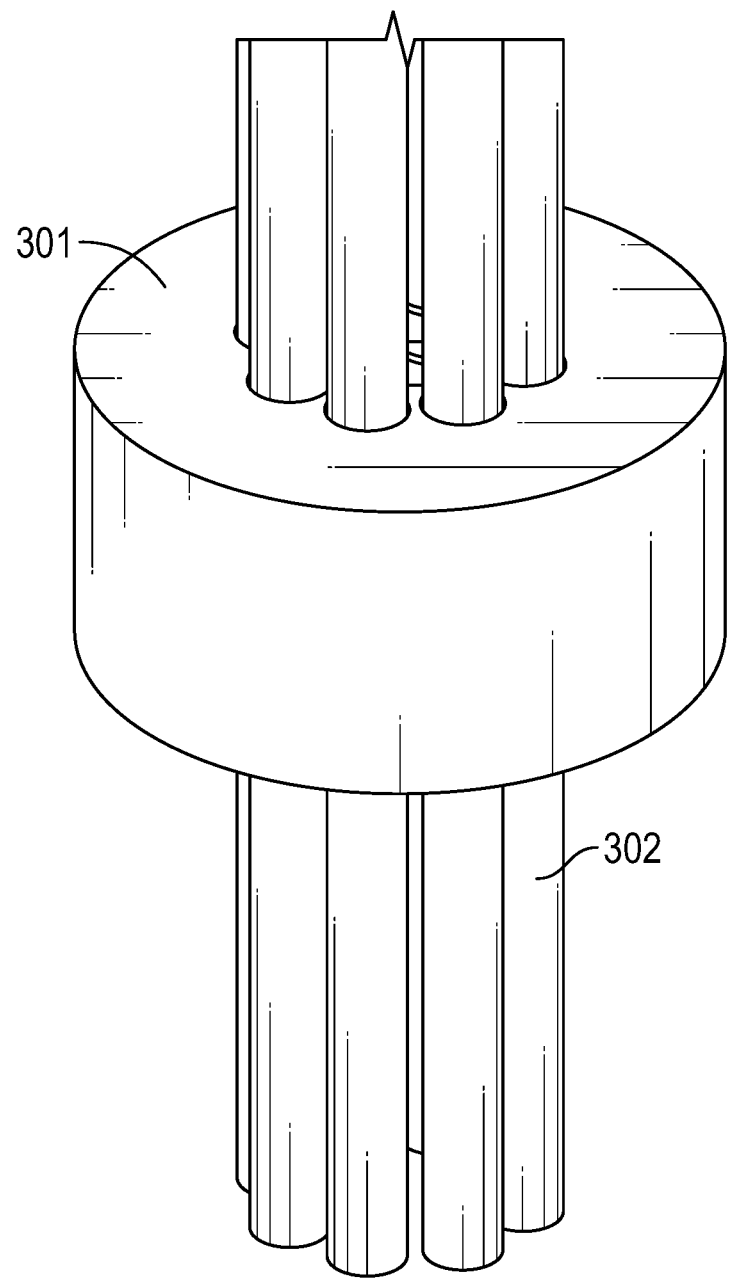
FIGS. 3-A and 3-B show a circular bracket with 8 tubes mounted in a circular orientation in accordance with the invention.
Figure 3B:
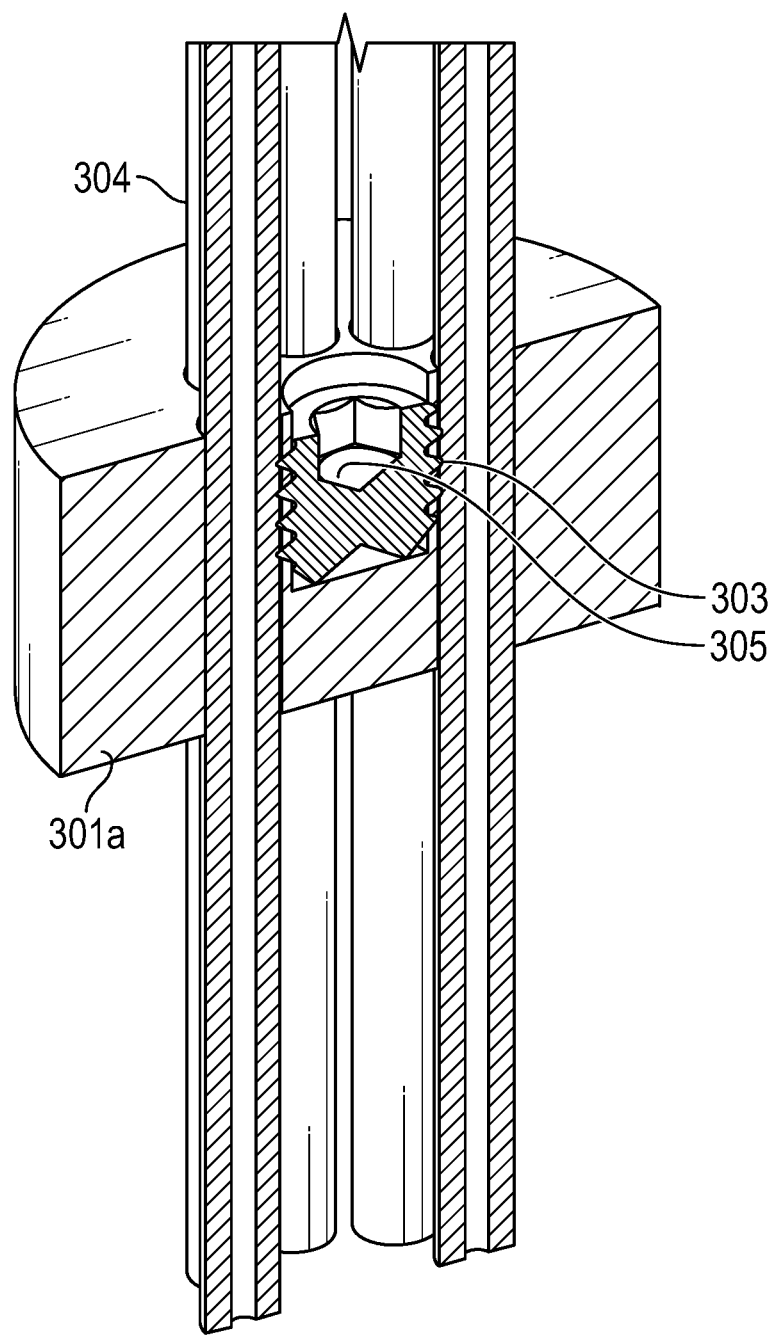
Figure 3C:
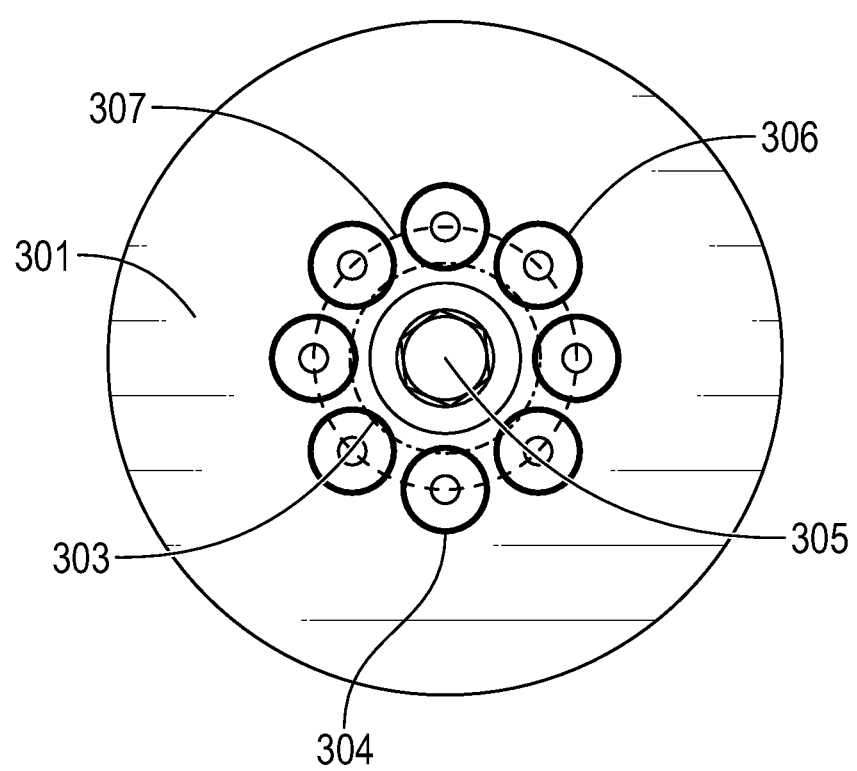

FIG. 3 shows 3 views of an embodiment of the invention where 8 each dispense tubes 304, are mounted in a circular pattern to a circular dispense manifold 301(*a*), where the center of the tubes is on a diameter of 4.95 millimeters 307. This figure demonstrates that the invention enables tubes 302, that are 1.57 millimeters (0.0625 inch) outside diameter 306, to be mounted to a manifold much closer to each other than using commercial means and that all 8 tubes are secured by intersection of the threads 303, of only one set screw 305 with the outside wall 304, of 8 tubes 302. FIG. 3-A shows the tube manifold assembly intact whereas FIG. 3-B shows a cutaway view 301(*a*) of the same manifold to show the construction and FIG. 3-C shows a top view of the intact assembly.

Figure 4A:
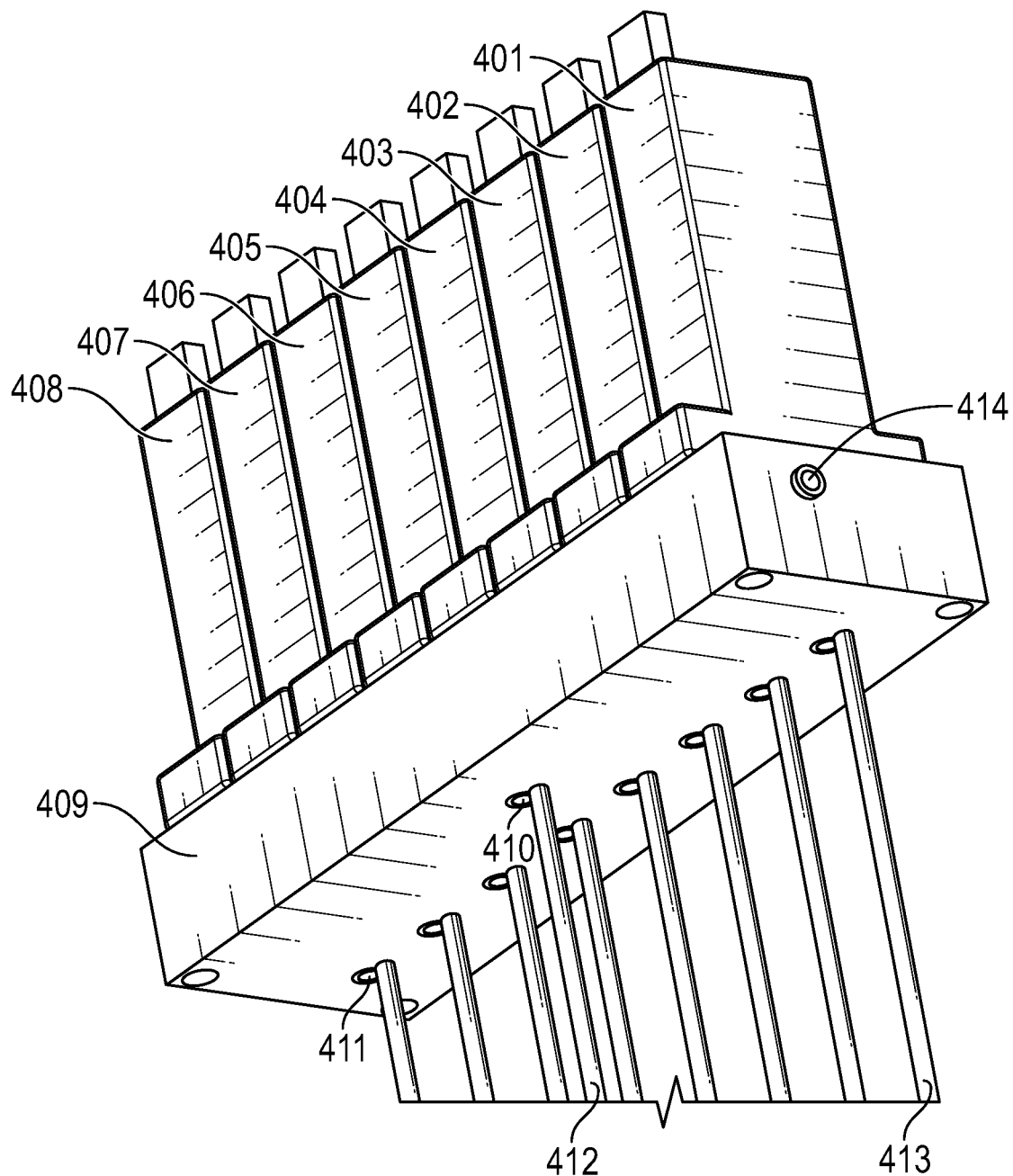
FIGS. 4-A, 4-B and 4-C are views of a valve manifold where tubes are fixed to the manifold in accordance with the invention.
Figure 4B:
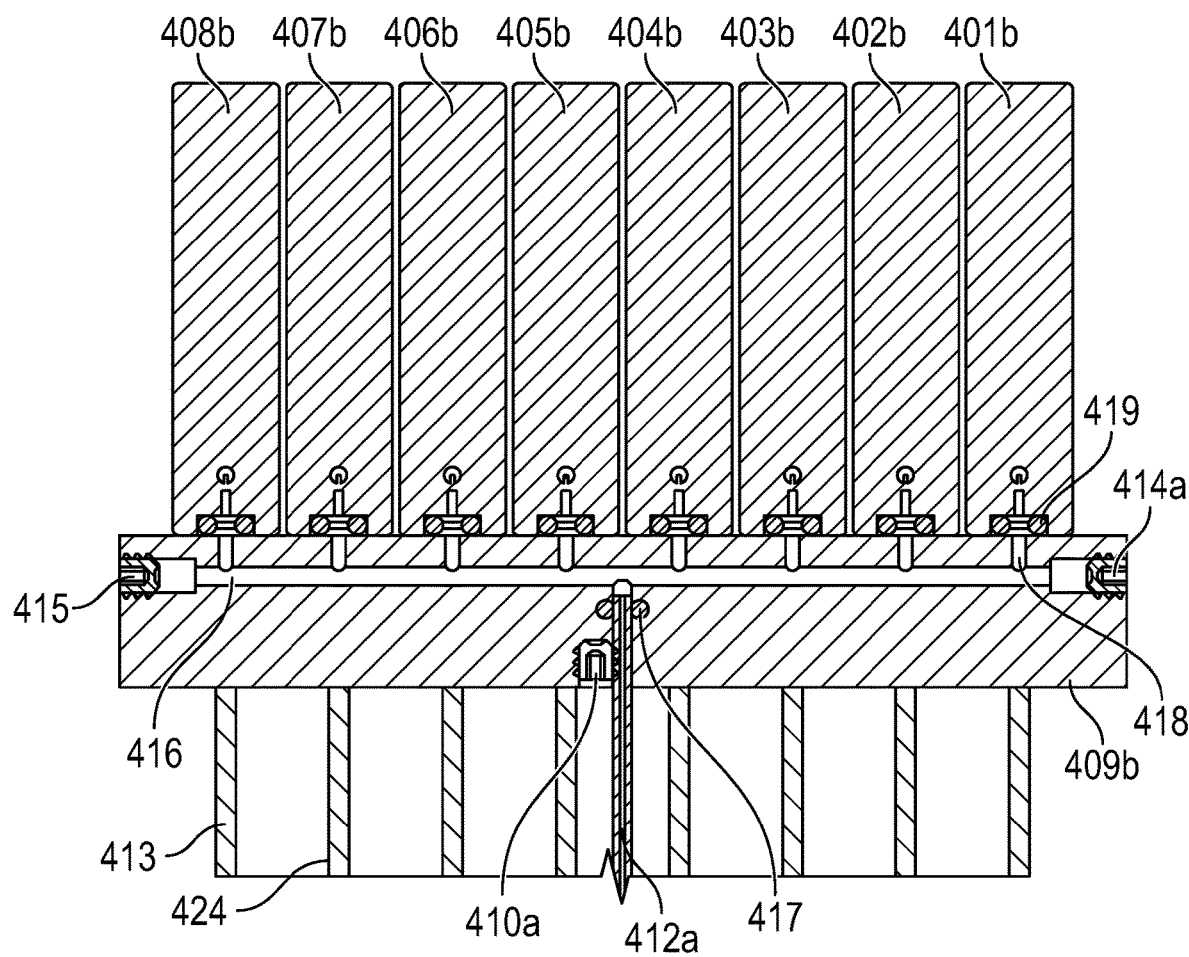
Figure 4C:
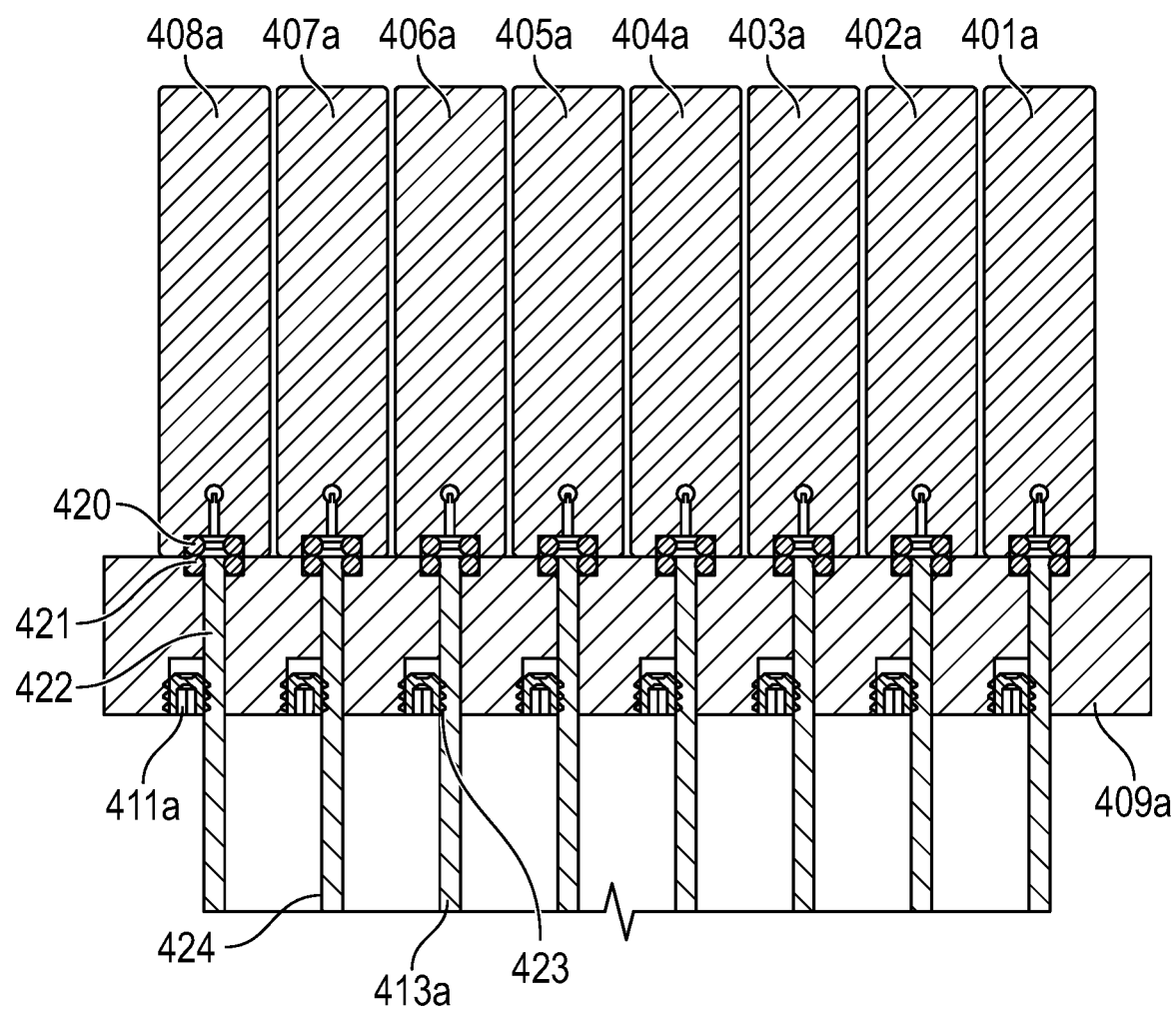

FIG. 4 shows 3 views of one embodiment of the invention where an 8 port distribution valve manifold, shown in FIGS. 4-A, 4-B and 4-C, is built by mounting 8 each dispense tubes 413(*a*), in a linear pattern and where dispense tubes 413(*a*), are fixed to manifold 409(*a*,*b*), and where solenoid valves 401(*a*,*b*) thru 408(*a*,*b*) make a fluid tight connection to manifold 409(*a*,*b*), and each tube 413(*a*), makes a fluid tight connection with manifold 409(*a*,*b*), through O-ring 421, and O-ring 421 makes a fluid tight connection to O-ring 420 which makes a fluid tight connection with solenoid valves 401(*a*,*b*) thru 408(*a*,*b*), and where tube 413(*a*,*b*), passes through manifold 409(*a*,*b*), through slip fit hole 422 and is held in place by set screw 411(*a*), threads 423 intersecting with the outside wall 424, of tube 413(*a*).

Figure 5A:
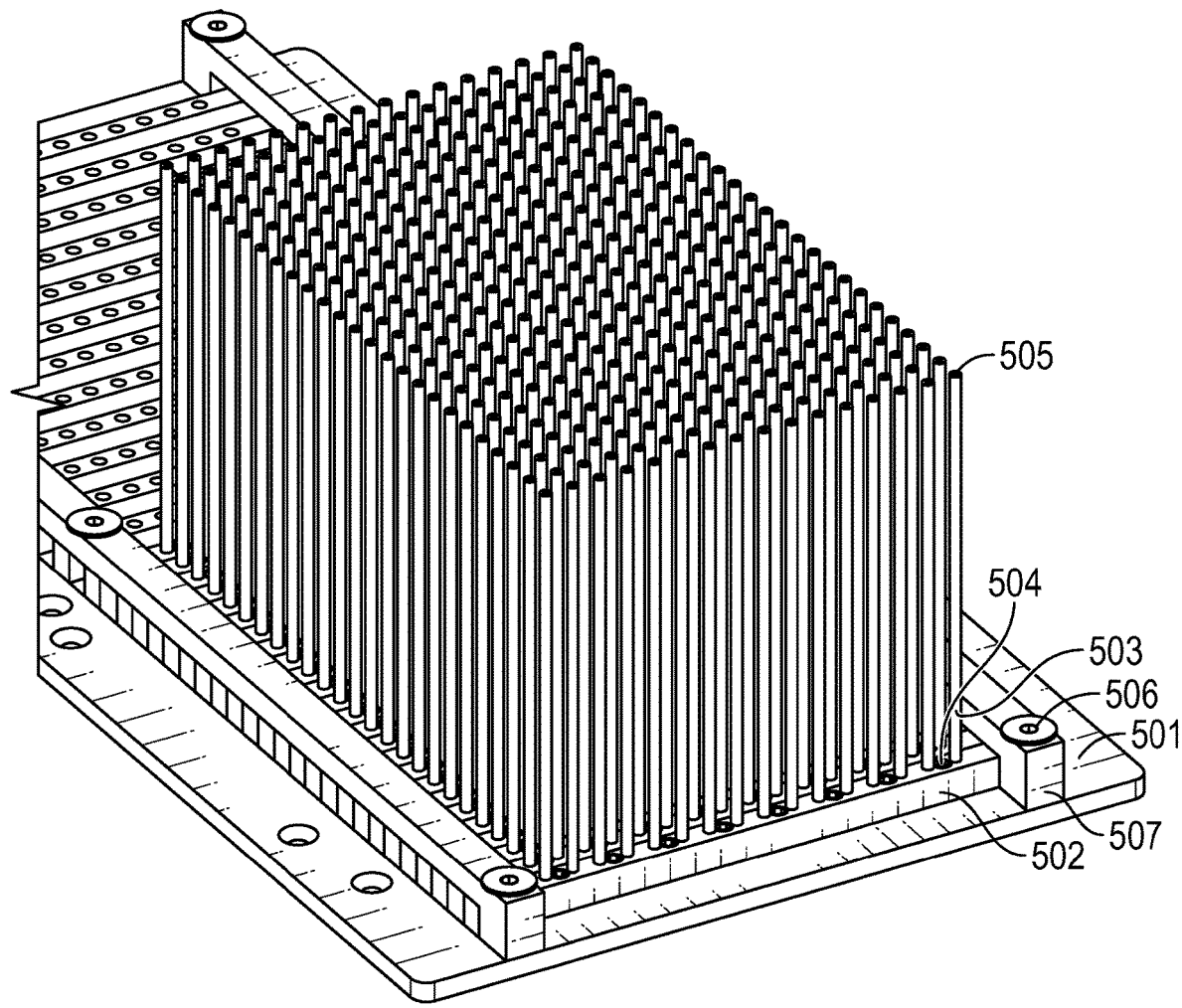
FIGS. 5-A and 5-B show a plurality of the bracket shown in FIG. 2 mounted on a frame part of an instrument.
Figure 5B:
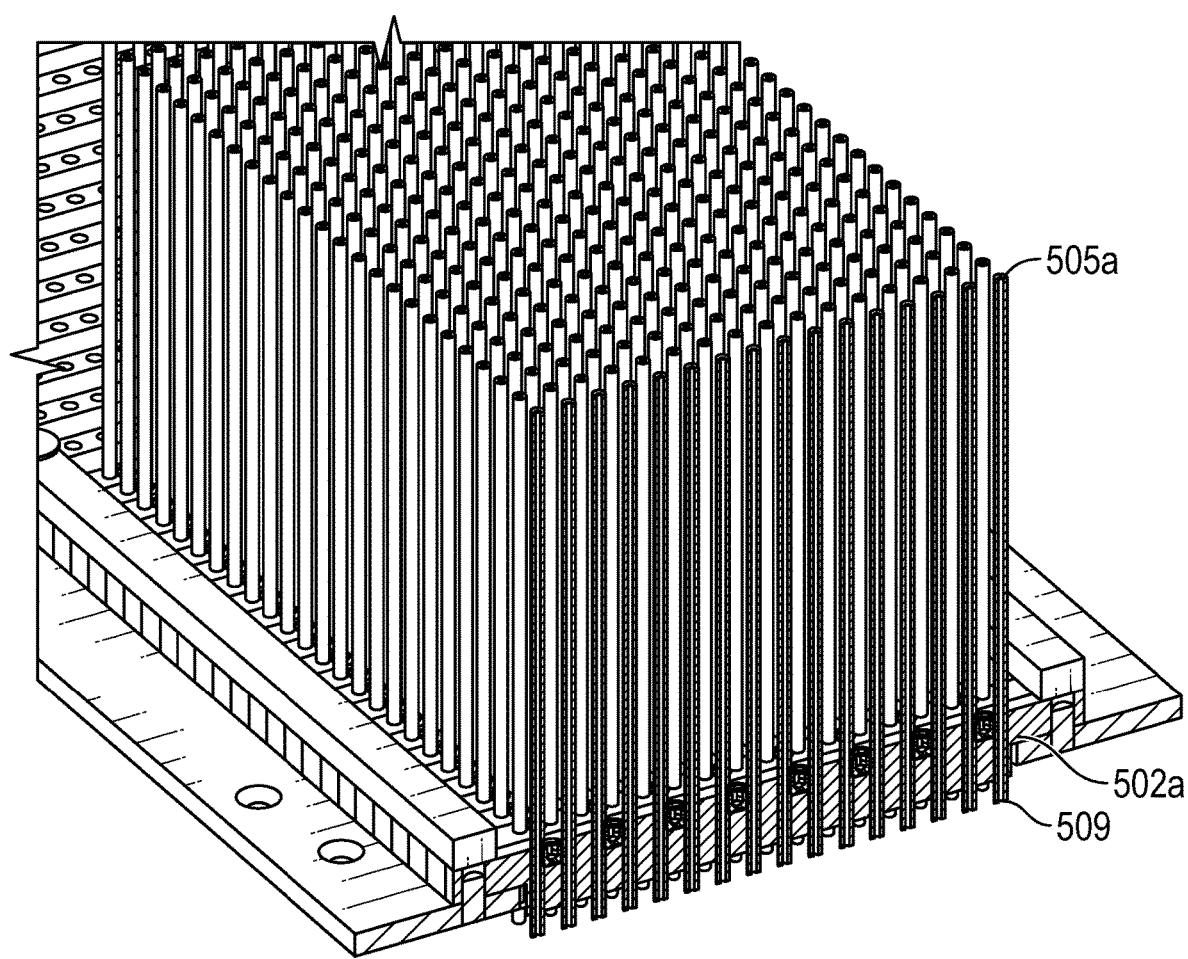

FIG. 5 shows a use of the embodiment described in FIG. 2. FIG. 5 shows many 16 tube dispensing manifolds of FIG. 2 mounted in a matrix where each tube center radius is 4.5 mm from adjacent tube center radii. The practical application is that this matrix of tubes has each tube align with an individual well in a 384 well plate. FIG. 5-A shows the entire assembly while FIG. 5-B shows a cutaway view of the assembly. FIG. 5 shows tube end 505(*a*), which comes from a distribution manifold which is not shown, tube 503, with tube end 509, fixed in place with set screw 504, to distribution manifold 502(*a*), which is attached to mounting plate 501, by brackets 507, and screws 506.

Figure 6A:
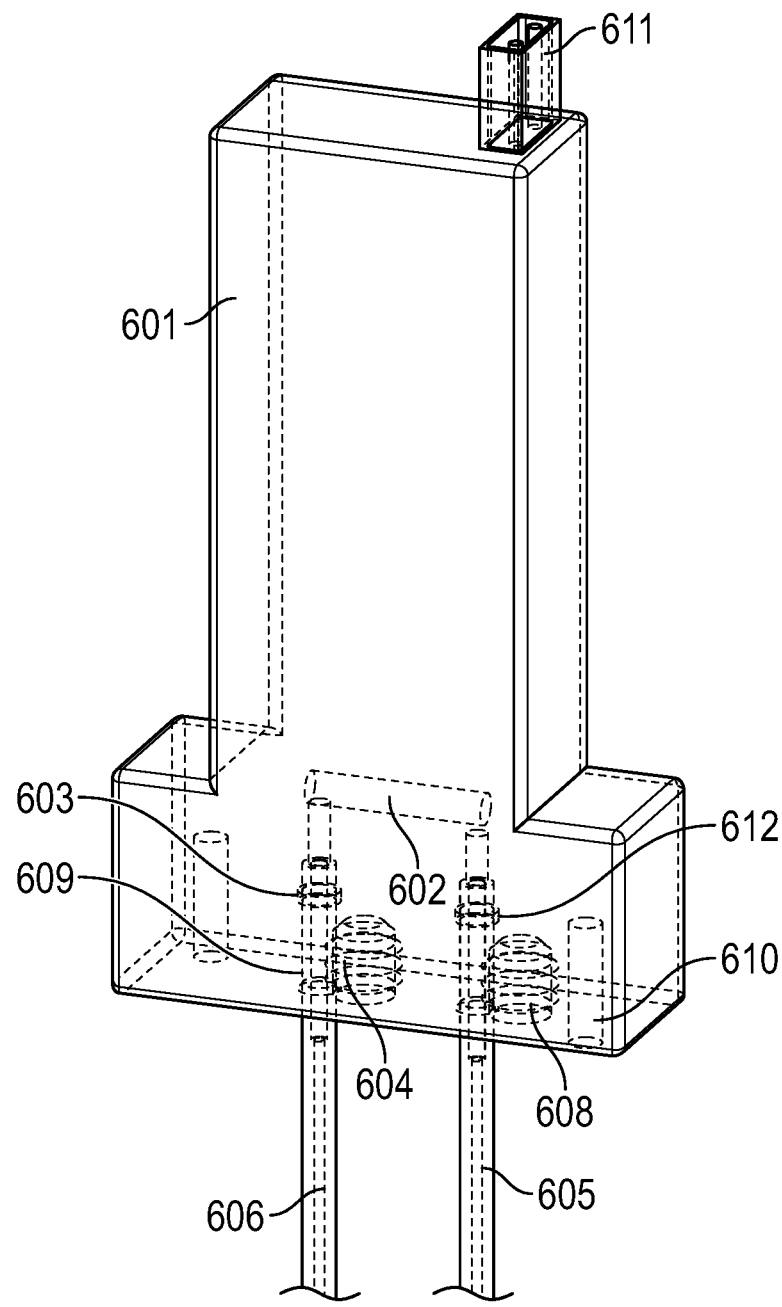
FIGS. 6-A and 6-B show a single valve which has been designed to make use of the invention to couple tubes to its ports.
Figure 6B:
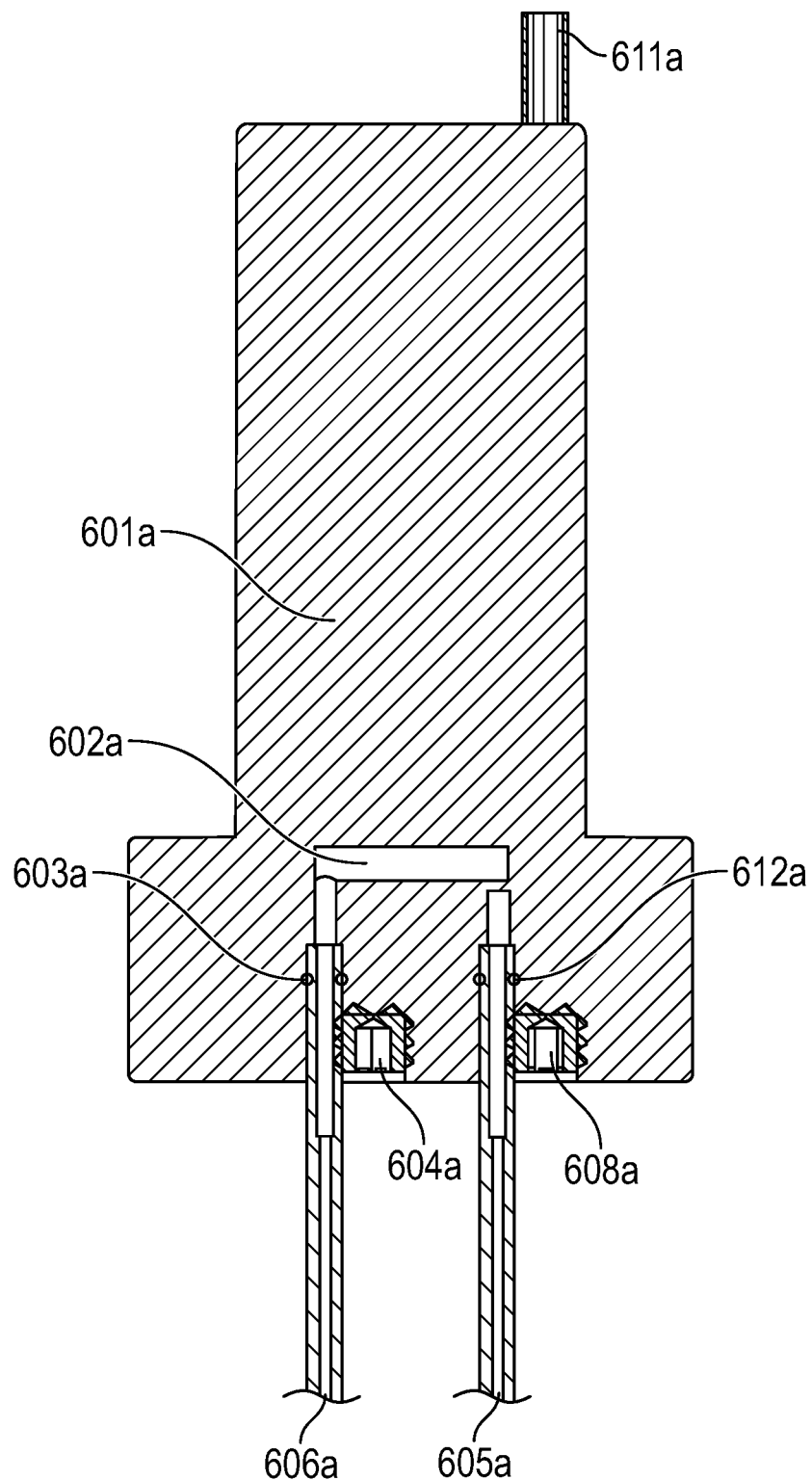

FIG. 6 show a single valve using the invention to couple tubes to its ports where the valve is designed with a body ready for using the invention to couple tubes to it achieving a fluid tight coupling. FIG. 6-A is an isometric wire frame view and shows the internal features that couple the tubes 605(*a*), and 606(*a*), to the valve body. FIG. 6-B is a side cutaway view showing the internal features of the invention that couple the tubes to the valve. The valve is a 2 port, 2-way solenoid valve with an electrical connector 611(*a*). The mechanisms that open and close the valve are not shows and are well known. Tube 606(*a*), is inserted into the valve body through slip-fit hole 609, and through O-ring 603(*a*), to form a fluid tight seal with the valve body. Tube 606(*a*), is secured to the valve body by the intersection of set screw 604(*a*), threads with the outer wall of tube 606(*a*). Flow Path 602(*a*), is a flow path in the solenoid valve and is shown to clarify the route of fluid flow. When the solenoid valve is energized the flow path through tube 606(*a*), has a fluid tight flow path through to tube 605(*a*), where tube 605(*a*), makes a fluid tight connection to the valve body through O-ring 612(*a*), and tube 605(*a*), is fixed in place to the valve body by intersection of the outer diameter of tube 605(*a*), with the threads of set screw 608(*a*). Feature 610, is a mounting hole to mount the valve to a bracket.

What is claimed is:

1. Apparatus for securing tubes in a fixed position, comprising:
    a body to which a tube is to be fixed, the body having at least one smooth bore hole extending therethrough, the hole having a specified diameter and an axis;
    a tube made of a first material with an inner diameter accommodating fluid flow and having an outer diameter passing through the smooth bore hole in slip fit relation with the smooth bore of said hole;
    a threaded hole with helical grooves and having an axis parallel to the axis of the smooth bore hole and located such that grooves of the threaded hole intersect the diameter of the smooth bore hole; and
    a set screw made of a second material tougher than the first material of the tube and having threads that will seat in the threaded hole in a manner such that advancing the set screw scratches the outer diameter of the tube to a depth wherein the set screw retains the tube in place without deformation of the inner diameter of the tube whereby fluid flow in the tube is not affected by advancement of the set screw while the tube is retained in place by the set screw.

2. The apparatus of claim 1 wherein:
    a plurality of axially parallel smooth bore holes extending through the body in locations surrounding said threaded hole all with parallel axes, wherein the threaded hole intersects the diameter of each of the smooth bore holes;
    a plurality of tubes made of a first material with an inner diameter accommodating fluid flow and having an outer diameter passing through the smooth bore holes in slip fit relation with the smooth bores of said holes; and
    a set screw made of a second material tougher than the first material of the tube and having threads that will seat in the threaded hole in a manner such that advancing the set screw scratches the outer diameter of all of the tubes to a depth wherein the set screw retains the tubes in place without deformation of the inner diameter of the tubes whereby fluid flow in the tubes is not affected by advancement of the set screw while the tubes are retained in place by the set screw.

3. The apparatus of claim 1, wherein each of said set screws is in contact with one tube.

4. The apparatus of claim 1, wherein each of said set screws is in contact with more than one tube.

5. The apparatus of claim 1, wherein the spacing of said plurality of smooth bore holes matches the spacing of wells in a plate.

6. The apparatus of claim 1, wherein the body is a bracket fixed to an instrument frame and the at least one tube is fixed in a position such that fluid from an outlet orifice of each such tube lands in a designated reaction vessel of an instrument.

7. The apparatus of claim 1, wherein the body is a manifold for coupling at least one tube to an associated valve with an unobstructed flow path, the at least one tube being fixed by the manifold in a position such that an orifice of the tube aligns with a valve port with an unobstructed flow path between tube and valve.

8. The apparatus of claim 1, wherein the body is a valve, the at least one tube being fixed to the valve in a position that aligns an orifice of the tube to a valve port with an unobstructed flow path.

9. In a solid phase synthesis apparatus, the improvement comprising:
- a plurality of bodies to which tubes are to be secured in fixed positions, each body having a plurality of smooth bore holes, each hole having a specified diameter and an axis;
- plurality of tubes made of a first material with an inner diameter accommodating fluid flow and having an outer diameter passing through the holes in a slip fit relation with the smooth bore of the hole;
- a plurality of threaded holes with helical grooves, each threaded hole having an axis parallel to the axis of a smooth bore hole and located such that grooves of the threaded hole intersect the diameter of the smooth bore hole; and
- a plurality of set screws made of a second material tougher than the first material of the tubes and having threads that will seat in the respective threaded holes in a manner such that advancing the set screw scratches the outer diameter of the tubes to a depth wherein the set screws retain the tubes in place without deformation of the inner diameter of the tubes whereby fluid flow in the tubes is not affected by advancement of the set screws while the tubes are retained in place by the set screws.

10. The apparatus of claim 9, wherein each of said set screws is in contact with one tube.

11. The apparatus of claim 9, wherein each of said set screws is in contact with more than one tube.

12. The apparatus of claim 9, wherein the spacing of said plurality of smooth bore holes matches the spacing of wells in a plate.

13. The apparatus of claim 9, wherein the body is a bracket fixed to an instrument frame and the plurality of tubes are fixed in positions such that fluid from outlet orifices of each such tube lands in a designated reaction vessel of an instrument.

14. The apparatus of claim 9, wherein the body is a manifold for coupling each of the plurality of tubes to an associated valve with an unobstructed flow path, the tubes being fixed by the manifold in positions such that an orifice of each tube aligns with a valve port with an unobstructed flow path between tube and valve.

15. A method for securing tubes in fixed positions in a body comprising:
- providing a body having a plurality of smooth bore holes therein;
- providing tubes of a first material and having a specified outer and inner diameter accommodating fluid flow, the tubes arranged in spaced apart positions passing through the smooth bore holes in the body in slip fit relationship, the smooth bore holes having parallel axes;
- providing a plurality of threaded holes with helical grooves and with axes parallel to the smooth bore hole axes and located such that grooves of at least one threaded hole intersects one of the smooth bore holes;
- providing a plurality of plurality of set screws made of a second material tougher than the first material and having threads that will seat in the threaded holes; and
- advancing the set screws to an extent that the set screws scratch the outer diameter of the tubes to a depth wherein the set screws retain the tubes in place without deformation of the inner diameter of the tubes whereby fluid flow in the tubes is not affected.

16. The method of claim 15 wherein the body is a bracket supporting the tubes above wells.

17. The method of claim 15 wherein the body is a manifold.

18. The method of claim 15 wherein the tubes are arranged so that one of the threaded holes intersects one of the smooth bore holes.

19. The method of claim 15 where the tubes are arranged so the one of the threaded holes intersects two of the smooth bore holes.

20. The method of claim 15 wherein the tubes are arranged so that one of the threaded holes intersects more than two of the smooth bore holes.

\* \* \* \* \*